US011513920B2

(12) United States Patent
Danilov et al.

(10) Patent No.: US 11,513,920 B2
(45) Date of Patent: Nov. 29, 2022

(54) DISTRIBUTED SITE DATA RECOVERY IN A GEOGRAPHICALLY DISTRIBUTED DATA STORAGE ENVIRONMENT

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 44 days.

(21) Appl. No.: 17/136,867

(22) Filed: Dec. 29, 2020

(65) Prior Publication Data
US 2022/0206906 A1 Jun. 30, 2022

(51) Int. Cl.
*G06F 12/00* (2006.01)
*G06F 11/14* (2006.01)
*G06F 3/06* (2006.01)

(52) U.S. Cl.
CPC .......... *G06F 11/1469* (2013.01); *G06F 3/067* (2013.01); *G06F 3/0619* (2013.01); *G06F 3/0659* (2013.01); *G06F 11/1451* (2013.01); *G06F 11/1464* (2013.01)

(58) Field of Classification Search
None
See application file for complete search history.

(56) References Cited

U.S. PATENT DOCUMENTS 10,114,580 B1 10/2018 Srivastav et al.
10,289,488 B1 * 5/2019 Danilov .............. G06F 11/1076

* cited by examiner

*Primary Examiner* — Daniel D Tsui
(74) *Attorney, Agent, or Firm* — Amin, Turocy & Watson, LLP

(57) ABSTRACT

The described technology is generally directed towards recovering a chunk (or similar block of data) when the chunk is erasure coded into fragments, and recovery fragments need to be obtained from geographically distributed sites. The recovery fragments needed to perform recovery of a chunk are determined, and assigned to the geographically distributed sites as subtasks. Each site that receives a subtask from the requesting site obtains XOR-related fragments needed to produce the recovery fragment, performs the XOR operations on the XOR-related fragments to produce the recovery fragment, and returns the recovery fragment to the requesting site. When finished, a site receives another subtask until no subtasks remain, such that the fastest site or sites receive the most subtasks. The requesting site recovers the chunk from the received recovery fragments. The shared participation in the chunk recovery among the distributed sites provides for efficient distribution of the recovery-related resources and work.

20 Claims, 13 Drawing Sheets

DISTRIBUTED SITE DATA RECOVERY IN A GEOGRAPHICALLY DISTRIBUTED DATA STORAGE ENVIRONMENT

TECHNICAL FIELD

The subject application relates generally to data storage, and, for example, to a technology that facilitates recovering data, including recovering data in a geographically distributed environment, and related embodiments.

BACKGROUND

Contemporary data storage systems, such as Dell EMC®'s ECS (formerly Elastic Cloud Storage) service, store data in a way that ensures data protection while retaining storage efficiency. For example, erasure coding can be used to protect data. Erasure coding assures a relatively high level of fault tolerance with modest capacity overheads.

In chunk-based systems such as ECS, data protection is implemented at the chunk level by dividing a chunk into k data fragments, and encoding the chunk into m redundant coding fragments, resulting k+m total fragments. For example, a system configured as a cold archive may use a 10+2 erasure coding scheme, in which k equals 10 and m equals 2. The way the encoding is done assures that the system can tolerate the loss of up to m fragments; the coding fragments can be re-encoded if the ten data fragments are valid, or eight data valid fragments plus two valid coding fragments or nine valid data fragments plus one valid coding fragment can be used to decode the chunk's data, and thereby recover the full set of chunk fragments.

For additional protection of user data and metadata, ECS supports geographically distributed setups of multiple sites (geographically distributed node clusters, alternatively referred to as geo-sites, geographic zones, or geo-zones). When there are three or more geographic sites, an exclusive OR (XOR) technique can be used to minimize capacity overhead associated with such additional data protection. For example, with N geographically distributed sites, instead of storing multiple chunks of identically replicated data per site, one site can store one chunk of data, another site can store a different chunk of data, and so on up to N−1 chunks, with one other site storing a chunk of data that is a bitwise XOR of the N−1 different chunks. In a more particular example, consider that in a four zone site, some chunk A of data is owned/stored by Site S1, Site S2 stores a (different) chunk B, Site S3 stores another (different) chunk C and site S4 stores chunk X, which is chunk A XOR'ed with chunk B XOR'ed with chunk C. Then if chunk A is ever lost or corrupt, chunk A can be restored via an XOR of chunk X and chunk B and chunk C; similarly if chunk B is ever lost or corrupt, chunk B can be restored via an XOR of chunk X and chunk A and chunk C, and so on.

To be practical in a large data storage system, data blocks (e.g., chunks) are relatively large. Chunk recovery, needed when a chunk is lost or corrupt, is performed by one site, which may break load balance between sites. Indeed, one site, normally the site with the XOR chunk, may need to receive a group of normal chunks, process the chunks via the XOR operation(s) back into the recovered chunk, and send the recovered chunk back to the site where it is owned.

Additional obstacles may make GEO recovery undesirably slow. For example, when geo-recovery is driven by one site, and another site detects corruption/loss of a fragment of one of the chunks needed for GEO recovery, the other site does not provide the chunk until that other site completes local recovery of the chunk data. As another example, there may be a low bandwidth (temporary or permanent) connection between the site that drives GEO recovery (e.g., the site with the XOR chunk) and the other sites. In this case, GEO recovery may take a very long time.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
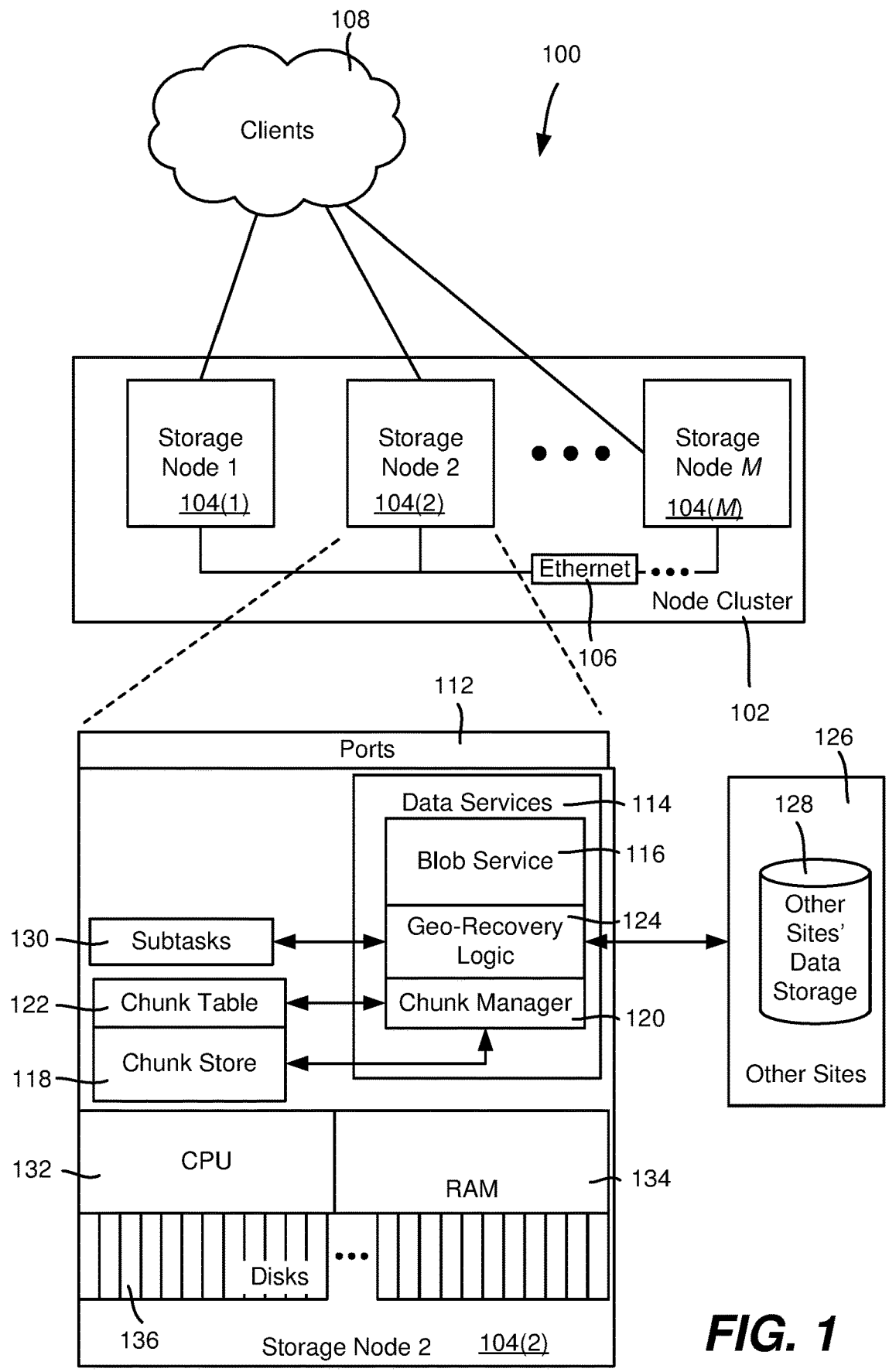
FIG. 1 is an example block diagram representation of part of a data storage system including nodes and geographic zones, in which geographic recovery of data can be performed via subtasks, in accordance with various aspects and implementations of the subject disclosure.

Various aspects of the technology described herein are generally directed towards more efficient data recovery in a geographically distributed/dispersed environment that uses the geo-XOR technique for remote data backup. Note that geo-recovery is used when chunk data owned by one local site needs to be recovered, but insufficient valid data fragments and/or coding fragments are locally available to perform the chunk recovery via decoding.

In one aspect, geo-recovery works at the fragment level, which is feasible because XOR is a bitwise operation. To this end, a site needing chunk recovery of a missing or corrupted chunk determines which fragments are needed to recover the chunk's data, and decomposes the needed fragments into subtasks. The subtasks are then assigned to each of the geographically distributed sites. In this way, each site participates in recovering part of the chunk's data, rather than have one site drive the recovery process for an entire chunk by obtaining the various XOR-related chunks. As the term is used herein, a site "needing" recovery involves a recovery condition being present and the site requesting the recovery, such as, but not limited to, when storage becomes missing or damaged.

When a site receives a subtask, (which could be the local site driving the recovery), the site communicates with the other sites to obtain the XOR-related data fragments, XORs the XOR-related data fragments into the requested recovery fragment corresponding to the subtask, and communicates the recovery fragment back to the requesting site. Thus, the multiple sites operate in parallel to obtain the needed recovery fragments, and moreover, entire chunks need not be communicated between sites, only chunk fragments.

It should be noted that not all fragments may be needed to recover a chunk. For example, a local site needing chunk recovery may still have some valid data and/or coding fragments. Thus, only those R fragments needed to complete the recovery become assigned subtasks, where R is a natural number between 1 and k (in a k+m erasure coding scheme).

In one implementation, only one subtask is assigned to each site at a time. When there are more subtasks than sites, a next previously unassigned subtask is assigned to a site that has completed a subtask, and so on, until no subtasks remain to be assigned. In this way, if one site is relatively slow in completing its assigned subtask (e.g., that slow site is particularly busy and/or has a low bandwidth connection), faster sites get the next assigned subtasks and thus perform more of the communications and processing work needed to complete the subtasks relative to the slower site(s).

It should be understood that any of the examples herein are non-limiting. For instance, some of the examples are based on ECS data storage technology; however virtually any storage system may benefit from the technology described herein. As a more particular example, the term "chunk" can be used as an example of a unit of data storage, however any data block can be used in other storage systems. Similarly, a 10+2 erasure coding scheme is used in the examples, however it is understood that the technology described herein works with other k+m erasure coding schemes (e.g., 12+4). Still further, an example with relatively many sites (e.g., eight) is used to emphasize the parallel and distributed aspects of the technology; however any three or more geographically distributed sites that provide data backup via XOR-related data can benefit from the technology described herein. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

In ECS, disk space is partitioned into a set of blocks of fixed size called chunks, which in one or more implementations are 128 megabytes in size. The various types of data, including user data and various types of metadata, are stored in chunks. There are different types of chunks, one type per capacity user. In particular, user data is stored in repository chunks, and chunks can be shared. For instance, one chunk may (and in typical cases does) contain segments of multiple user objects. Further, as described herein, chunk data can be divided/encoded according to an erasure coding scheme into data fragments and coding fragments.

As set forth herein, geographic sites (zones) can be used to replicate data, including user chunks, for additional data protection. The various user data chunks are distributed among the zones, with one zone (a node in the zone cluster) responsible for owning a given chunk. Site-based replication is based on the XOR-ing of a chunk's data with the data of other chunks to reduce the overall size of the data needed to recover a group of XOR-related chunks. For example, for data storage environments having three or more sites, XOR can be used; for Site S1 (which owns Chunk A) and Site S2 (which owns Chunk B), both sites can replicate their respective chunks A and B to Site S3. Site S3 does not store chunk copies for Chunk A and Chunk B but instead only one Chunk X is stored by Site 3, comprising the result of XOR (eXclusive OR) for Chunk A content and Chunk B content, that is, Chunk X=XOR(Chunk A, Chunk B).

When a chunk with user data, e.g., Chunk A or Chunk B, is unavailable, the corresponding XOR chunk can be used to restore its content via GEO recovery. GEO recovery can be represented as:

Chunk A=XOR(Chunk X, Chunk B), and

Chunk B=XOR(Chunk X, Chunk A).

However, as set forth herein, recovery of a complete chunk (e.g., 128 MB) can take time and significant resources, so only the needed fragments are recovered by the distributed sites, separately and in parallel.

FIG. 1 shows part of a data storage system 100 (such as ECS) comprising a node cluster 102 of storage nodes 104(1)-104(M), in which each node is typically a server configured primarily to serve objects in response to client requests. The nodes 104(1)-104(M) are coupled to each other via a suitable data communications link comprising interfaces and protocols, such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) (shown enlarged in FIG. 1 as well) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes an instance of a data storage system and data services 114; (note however that at least some data service components can be per-cluster, rather than per-node). For example, ECS runs a set of storage services, which together implement storage logic. Services can maintain directory tables for keeping their metadata, which can be implemented as search trees. For example, a blob service 116 maintains an object table (e.g., in various partitions among nodes, including geographically separated zones) that keeps track of objects in the data storage system and generally stores their metadata, including an object's data location information, e.g., within a chunk.

FIG. 1 further represents some additional concepts, in that the user data repository of chunks is maintained in a chunk store 118, managed by another storage service referred to as a chunk manager 120. A chunk table 122 maintains metadata about chunks, e.g., as managed by the chunk manager 120; this includes the node/storage device locations of the data fragments and coding fragments that make up a data chunk. Note that directory tables and other data can also be maintained in data chunks.

In one or more implementations, the data services 114 include geo-recovery logic 124, along with replication and geo-recovery related communications to and from remote sites 126 and their data storage 128. When geo-recovery is needed or requested, the geo-recovery logic 124 maintains a data structure such as a list of the subtasks 130 corresponding to the needed recovery fragments. As is understood, sending data between a local zone and a remote zone is relatively inefficient, and communication of entire chunks to recover a chunk is thus desirably avoided via the technology described herein.

In FIG. 1, a CPU 132 and RAM 134 are shown for completeness; note that the RAM 132 may comprise at least some non-volatile RAM. The node 104(2) further includes storage devices such as disks 136, comprising hard disk drives and/or solid-state drives, or any other suitable type of storage resource. As can be readily appreciated, components of the data storage system including those described herein can be at various times in any storage device or devices, such as in the RAM 134, in the disks 136, or in a combination of both, for example.

Figure 2:
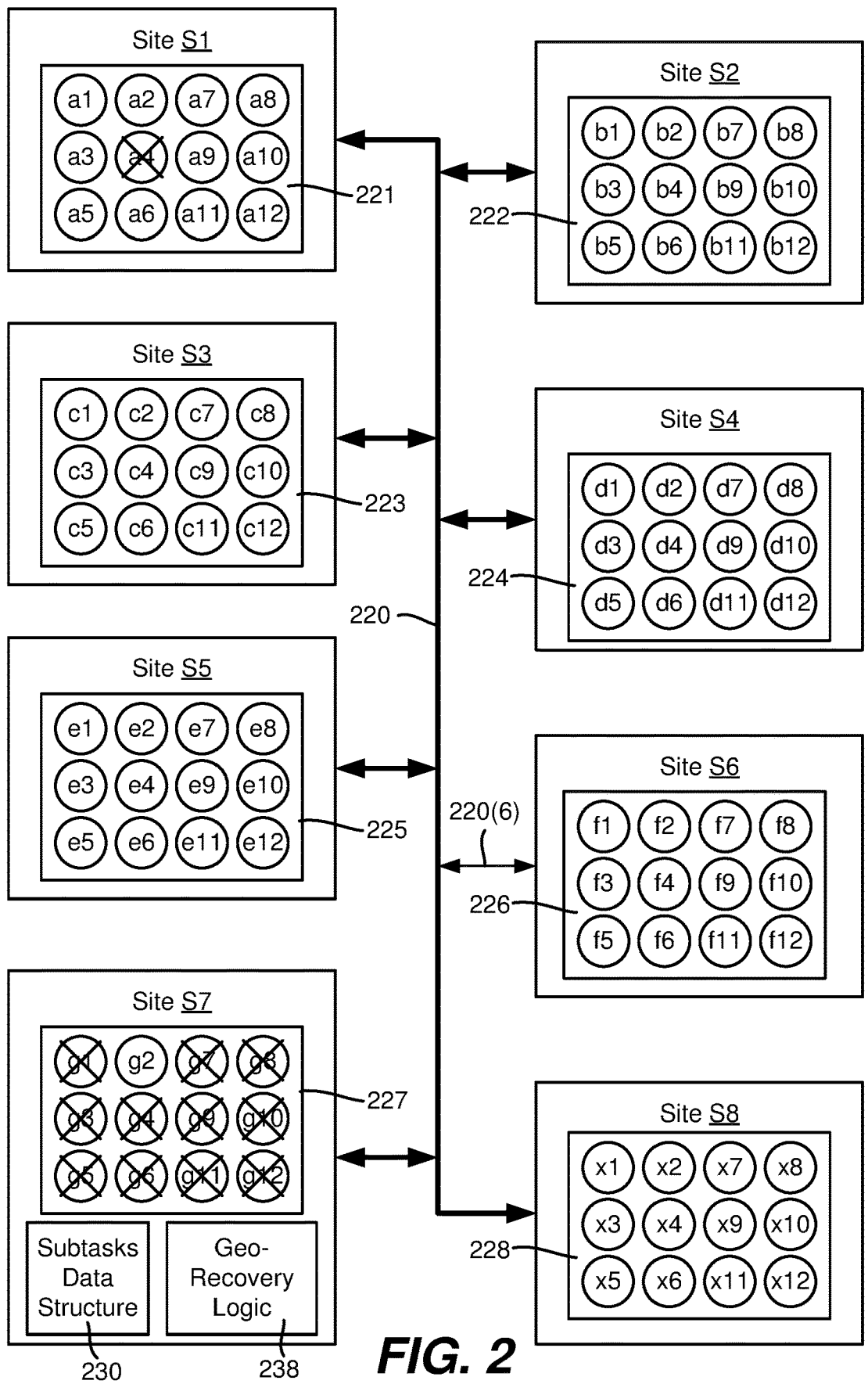
FIG. 2 is an example block diagram showing how sites maintain fragments related to data recovery when one site needs a chunk recovered, in accordance with various aspects and implementations of the subject disclosure.

As represented in FIG. 2, in an example implementation similar to the above example(s), there are eight geographically distributed sites S1-S8 that each communicate with one another via suitable communication links generally labeled 220. Note that the sites may not have the same communication bandwidths, as represented by the site S6 having a communication link 220(6) that appears "thinner" than the links between other sites (not separately labeled).

In general, each site owns one chunk of a group of XOR-related chunks. For example, site S1 owns chunk A 221, which is divided into (ten data and two coding) fragments a1-a12 in this example according to a 10+2 erasure coding scheme. Note that chunks are referred to as uppercase letters, and fragments that compose the chunks with corresponding lowercase letters. Thus, site S2 owns chunk B 222 composed of fragments b1-b12, and so on. Note that site S8 does not own a normal data chunk for the group, but rather the XOR chunk 228, which is likewise divided into twelve fragments x1-x12. As is typical, the respective fragments are distributed among the respective storage nodes and/or storage devices of their respective sites/clusters, so that failure of one storage device (or node) does not typically result in a chunk that cannot be recovered via the other fragments on non-failed storage devices (or nodes). However, despite the erasure coding protection, sometimes geo-recovery is needed or otherwise requested.

Consider that in the example of FIG. 2, site s7 needs or otherwise requests to recover chunk G 227. In this example, only fragment g2 of chunk G 227 remains valid (readable from a local node storage device and not-corrupted, as validated via a known checksum value). Thus, because FIG. 2 has a 10+2 erasure coding scheme for this chunk G 227, at least nine other fragments are needed from among the distributed sites, referred to herein as recovery fragments, to recover the chunk. Thus, while any nine fragments can be obtained, there is no reason to request more than nine recovery fragments, and thus geo-recovery logic 238 of site s7 adds nine subtasks to its subtasks data structure 230, e.g., corresponding to recovery fragments g1 and g3-g10 in this example. Note that other sites have similar geo-recovery logic that can create subtasks as needed, as well as process assigned subtasks as described herein, however such other geo-recovery logic (and subtask data structures) are not depicted for purposes of clarity in the figures.

Figure 3:
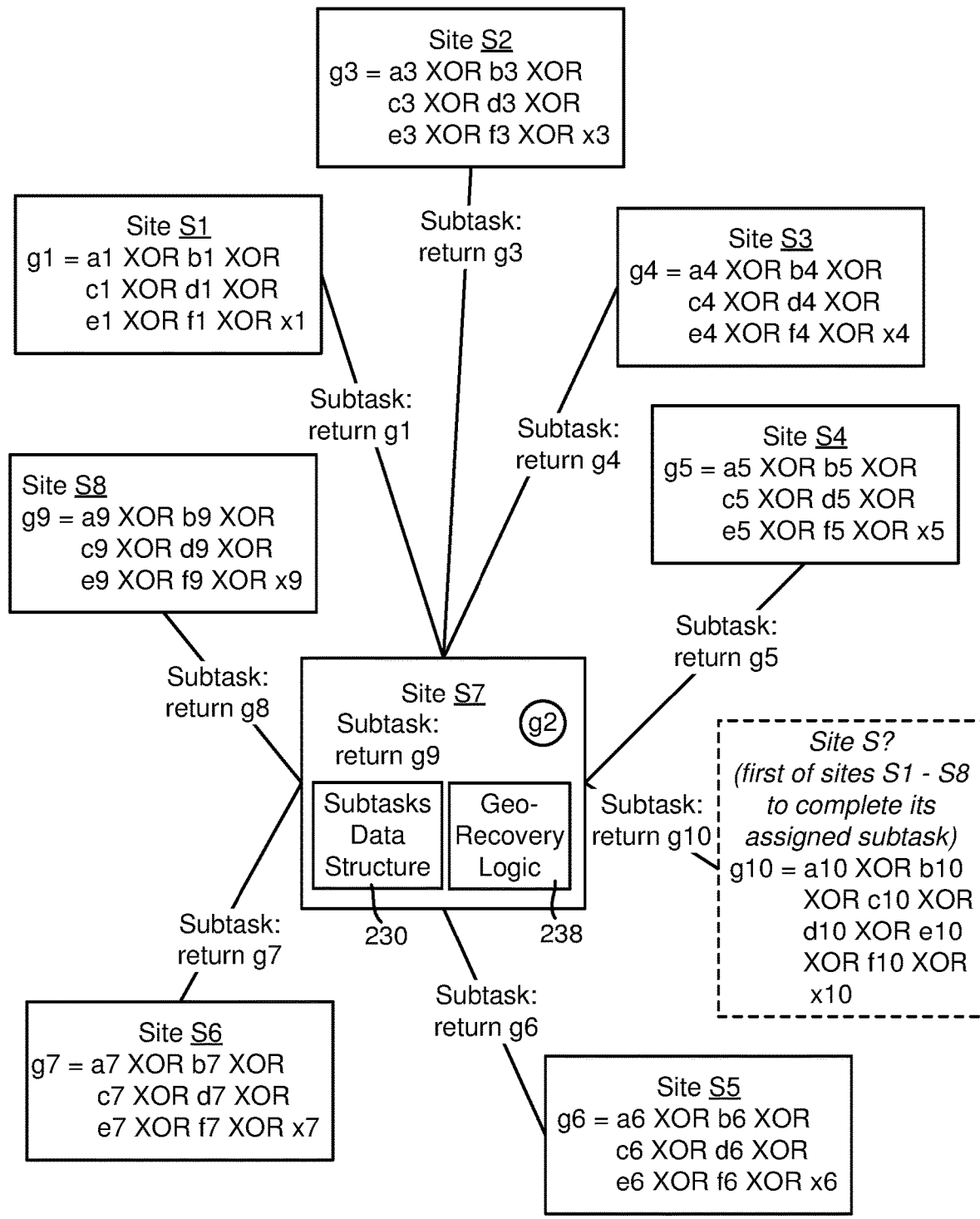
FIG. 3 is an example block diagram/dataflow diagram showing how sites receive and process subtasks for fragment-based data recovery when one site needs a chunk recovered, in accordance with various aspects and implementations of the subject disclosure.

As shown in FIG. 3, once the subtask data structure (list) is generated for chunk G's needed recovery fragments on the site S7, the geo-recovery logic 228 assigns the subtasks in a distributed manner among the sites, including one subtask to itself. Thus, site S1 is assigned the subtask of obtaining and returning the recovery fragment g1, site S2 is assigned the subtask of obtaining and returning the recovery fragment g3, site S3 is assigned the subtask of obtaining and returning the recovery fragment g4, and so on. The local site S7 needing or otherwise requesting recovery assigns itself the subtask of obtaining and returning the recovery fragment g9. The subtask of obtaining and returning the recovery fragment g10 is not yet assigned in this initial state, as there are more subtasks than distributed sites; in one implementation the recovery fragment g10 will be assigned to the first site that completes its assigned subtask.

As can be seen in the example of FIG. 3, Site S1 can satisfy the assigned subtask by obtaining (and then returning) the requested recovery fragment g1 by the following XOR operations on the XOR-related fragments a1, b1, c1, d1, e1, f1 and x1:

g1=a1 XOR b1 XOR c1 XOR d1 XOR e1 XOR f1 XOR x1.

Because the site S1 already has the XOR-related fragment a1, the site S1 communicates with the site S2 to obtain a copy of XOR-related fragment b1, with the site S2 to obtain a copy of fragment c1 and so on up to site S8 (skipping the site s7 that is driving the recovery) to obtain a copy of fragment x1.

Similarly, the site S2 can satisfy the assigned subtask by obtaining (and then returning) the requested recovery fragment g3 by the following XOR operations on the XOR-related fragments a3, b3, c3, d3, e3, f3 and x3:

g3=a3 XOR b3 XOR c3 XOR d3 XOR e3 XOR f3 XOR x3.

Because the site S2 already has the XOR-related fragment c3, the site S2 communicates with the site S1 to obtain a copy of XOR-related fragment a3, with the site S3 to obtain a copy of fragment c3 and so on up to site S8 (similarly skipping the site s7 that is driving the recovery) to obtain a copy of fragment x3. As is understood, other sites perform similar operations of obtaining the XOR-related fragments corresponding to their assigned subtasks, XOR-ing those XOR-related fragments, and returning the recovery fragment in response to the assigned subtask request.

Figure 4:
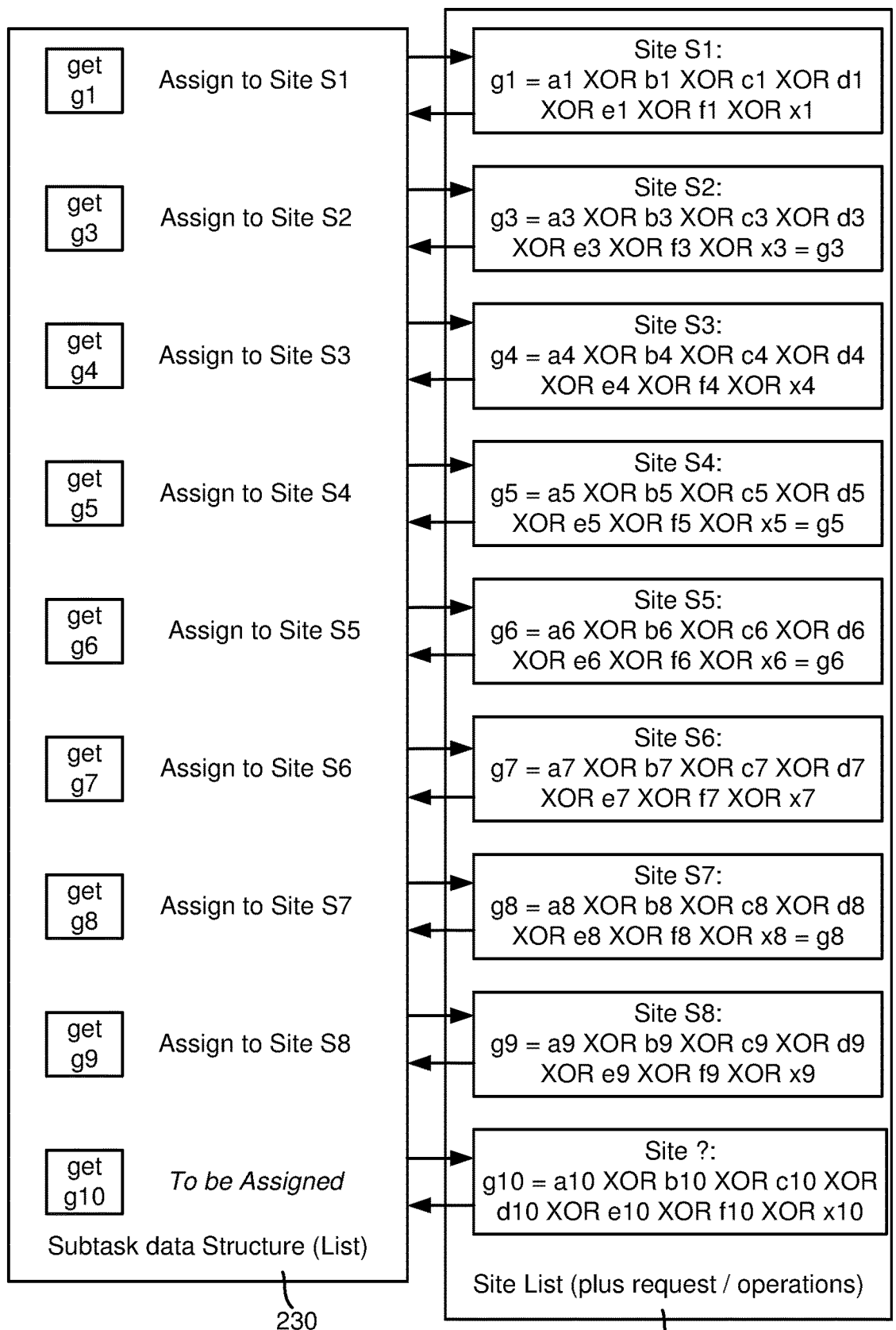
FIG. 4 is an example representation of subtasks and sites/operations for recovering a data chunk via XOR-related data fragments, in accordance with various aspects and implementations of the subject disclosure.

FIG. 4 shows the initial state of FIG. 3 from the perspective of the local site 7 that is assigning the subtasks. The subtask data structure 230 (list/queue/log or the like) initially has the nine subtasks g1 and g3-g10 maintained, which get assigned to the eight geo-sites, such as by keeping a site list 440. For purposes of explanation, the site list 440 also shows the requested recovery fragment and the XOR operations expected, although as will be understood this is not all needed by the geo-recovery logic which in general only needs to assign subtasks to the sites and track when the recovery fragments (or errors) are received.

Once the recovery fragments are received, recovery is performed. If the recovery fragments are data fragments, then encoding is performed to obtain the coding fragments, e.g., g11 and g12, which then recreates the full 10+2 erasure coding protected chunk fragments, which can be stored in a distributed manner among the local nodes/storage devices of the site S7. If one or two of the recovery fragments are coding fragments, then decoding is performed to obtain the still-missing data fragments, and the full set of fragments stored in a distributed manner among the local nodes/storage devices of the site S7.

It should be noted that while it is feasible to obtain the full set of data fragments and coding fragments via geo-recovery as described herein, it is generally more efficient to only obtain the minimum number of fragments needed for recovery of the chunk, and generate any missing fragments locally from that minimum number.

It is not guaranteed that a site can complete a subtask, that is, produce a recovery data fragment, immediately. A site needs up to N-1 data fragments to complete the subtask, where N is the number of sites in the GEO-dispersed setup. One of the data fragments might be missing/corrupt, such as the fragment a4 in chunk 221 of site S1 (FIG. 2). If such a condition detected, an error is returned, whereby the GEO recovery subtask returns to the subtask list, e.g., appended to the end. Local recovery is triggered for the missing/corrupt data fragment needed for GEO recovery. The subtask will be handled later on; meanwhile, during the local recovery, the system may continue with GEO recovery by completing other subtasks.

Chunk recovery thus finishes when the local site (S7 in this example) gets the needed data fragments and performs the encoding (and/or any decoding) to obtain the full erasure coding-protected chunk data. Chunk recovery fails when there are not sufficient fragments to perform recovery. Note that recovery data fragments can be requested instead of recovery coding fragments, but if a recovery data fragment cannot be obtained, a subtask can be added to attempt to obtain a coding fragment instead. In the previous example, if the recovery data fragments are g1-g10 (nine of which were requested), and the recovery coding fragments are g11 and g12 (neither of which were requested), and the data fragment g4 cannot be obtained, one of the recovery fragments such as g11 can be requested, which if obtained, can be used to locally decode data fragment g4.

Figure 5:
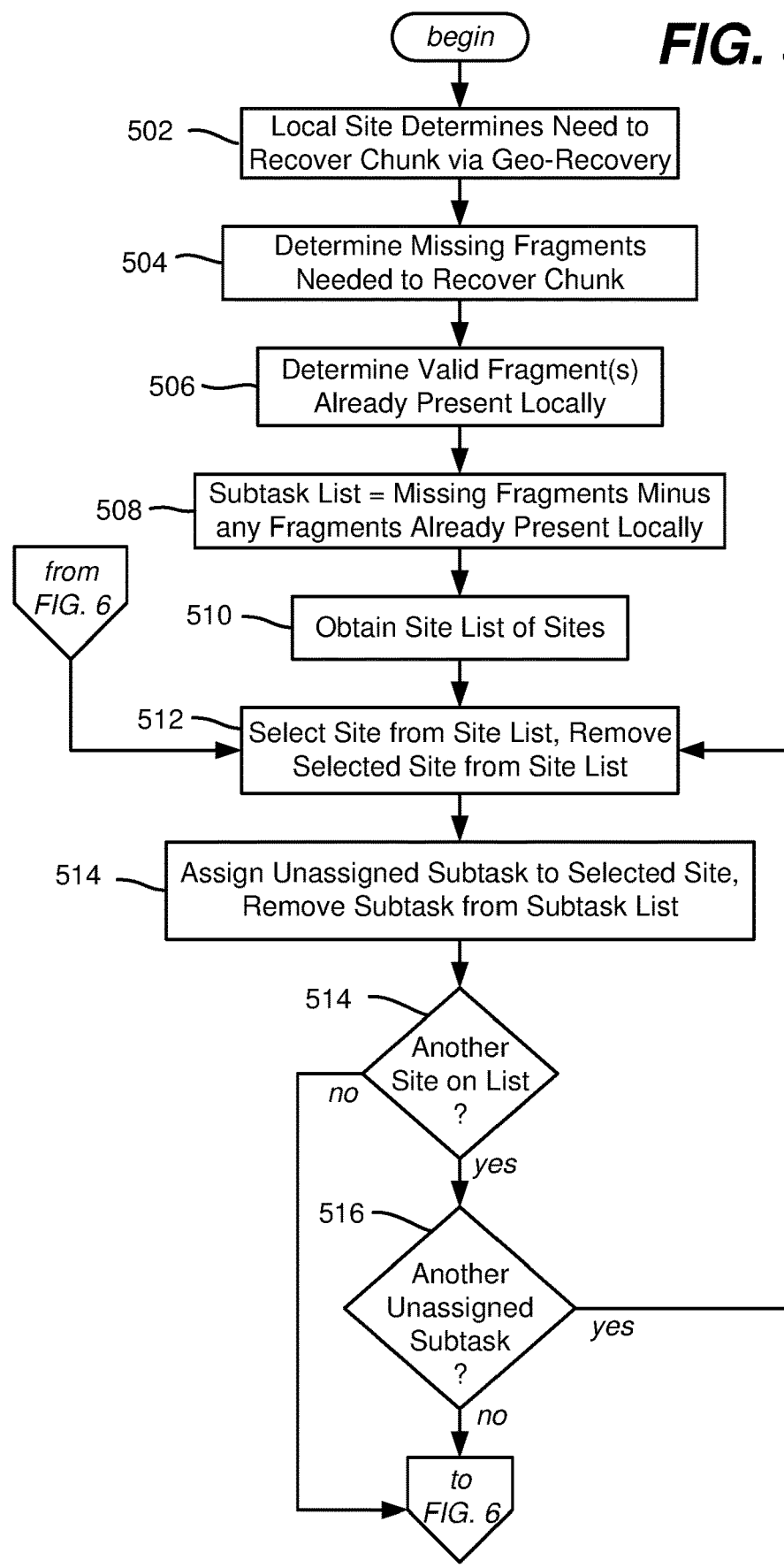
FIGS. 5 and 6 comprise an example flow diagram showing example operations related to directing geographically distributed sites to perform assigned subtasks related to recovering a data chunk via XOR-related data fragments, in accordance with various aspects and implementations of the subject disclosure.
Figure 6:
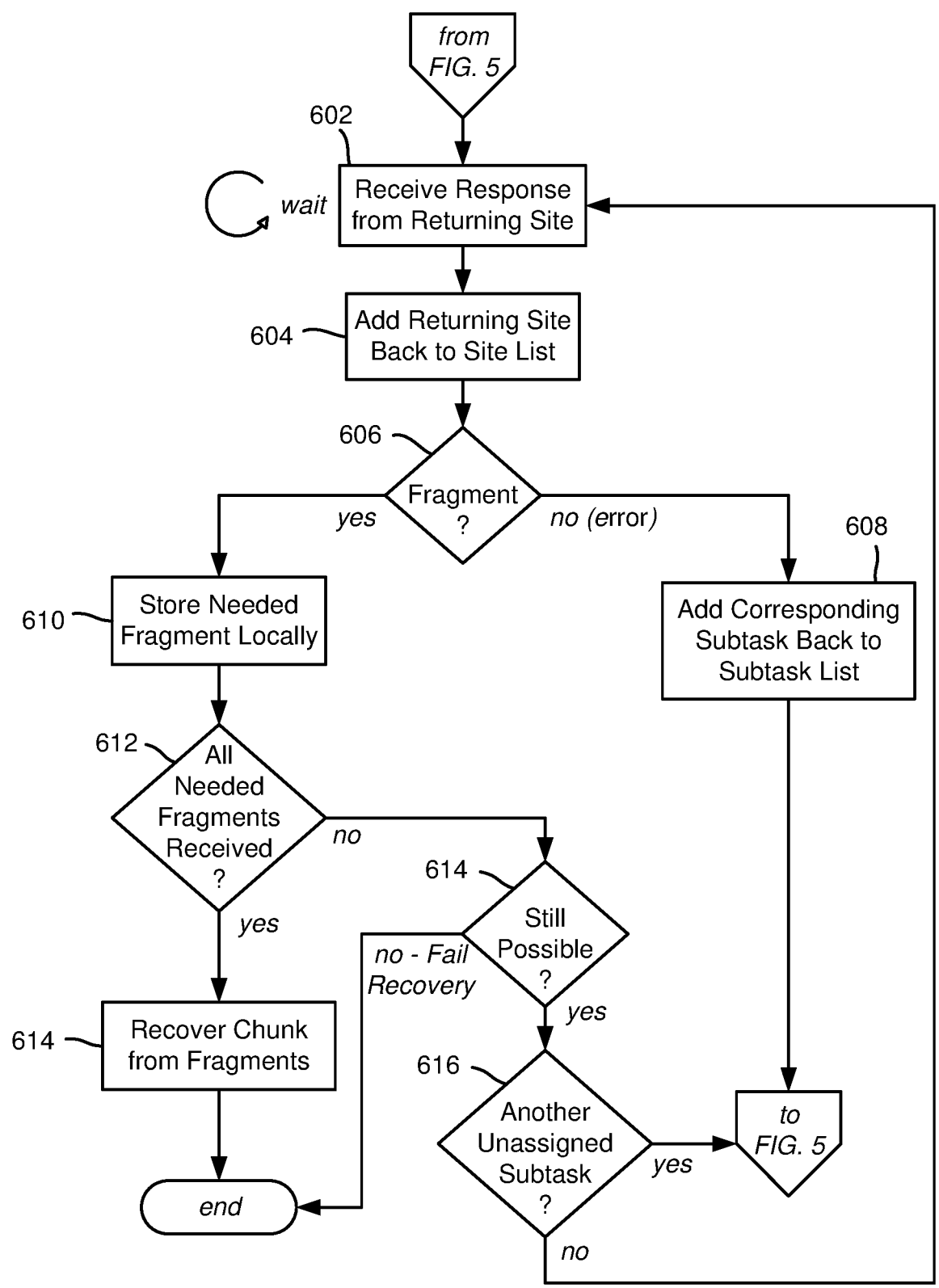

FIGS. 5 and 6 comprise a flow diagram of example operations related to assigning subtasks needed for recovering a chunk. Operation 502 represents a local site determining that it needs to recover a chunk via geo-recovery, e.g., because chunk data is requested and not enough data fragments and/or coding fragments are locally available to decode the missing data fragment(s).

Operation 502 determines the missing fragments needed to recover the chunk, e.g., a minimum of ten (data or coding) fragments according to the erasure coding scheme of 10+2 in this example, while operation 506 determines which, if any, valid fragments are already locally present. At operation 508, the subtask list is produced, e.g., the first ten fragments minus those already locally present and valid.

Operation 510 represents obtaining the list of sites that are to participate in geo-recovery, including returning of a recovery fragment. Note that the list need not be all sites, such as if a site is blacklisted with respect to being assigned a subtask, because of being known to be currently slow due to a known bad connection or being particularly busy; such a site will still need to provide the requested XOR-related fragments that it owns to other sites, but need not be assigned a subtask of obtaining a recovery fragment.

Operation 512 selects a site from the site list, and "removes" that site from the list; (e.g., the site can be delisted, but instead of actually delisting, a flag or other data can be used to mark that site's current state as being responsible for an assigned subtask, possibly including which subtask was assigned). Operation 514 assigns an unassigned subtask to the selected site, and removes the subtask from the subtask list, which can be by actual removal/dequeuing or by similarly by marking state data associated with that subtask as having been assigned, possibly including which site was selected for the subtask.

Operations 514 and 516 repeat the process of subtask assignment via operations 512 and 514, until either no sites remain (as evaluated at operation 514) without an assigned subtask (there were more subtasks than sites), or until no subtasks remain to be assigned (as evaluated at operation 516). The process continues to FIG. 6.

Operation 602 of FIG. 6 represents waiting until a response is received from a returning site, in which event the site is added back to the site list as being available for another subtask. Operation 606 evaluates whether the response was the requested recovery fragment, or an error. If an error, the subtask is added back to the subtask list to be reassigned. The process returns to FIG. 5, operation 512, as there is at least this one subtask on the subtask list to be assigned. Note that in the event of an error, the site returning the error is returned to being active in the site list, as there is no reason to not use that site for another subtask if one is available.

If the requested recovery fragment was returned, operation 610 stores the fragment locally, such as in working memory. If all needed fragments have been received as evaluated by operation 612, then operation 614 recovers the fragment, e.g., performing any encoding or decoding needed to obtain the full 10+2 data fragments and coding fragments (in this example) of the chunk for storing in the nodes of the local site, and the process ends.

If all needed fragments have not been received, operation 614 determines if recovery is still possible. More particularly, ten total fragments are needed for recovery, and if only nine or fewer can be obtained (whether already available from local storage or via XOR-based geo-recovery), including after local recovery is attempted on any missing/corrupt fragment(s) and any substitute fragments (e.g., g11 and g12) are secondarily requested via assigning one or more additional subtasks (not explicitly shown in FIGS. 5 and 6), the chunk recovery is not possible and the recovery operation fails. If however this (likely very rare) failure state has not been reached and recovery is still possible, operation 616 evaluates whether there is another unassigned subtask. If so, operation 616 returns to operation 512 of FIG. 5 to assign another subtask (at least one; note that at least the site returning the response at operation 602 is present in the site list). Otherwise, operation 616 returns to operation 602 to await another response.

Figure 7:
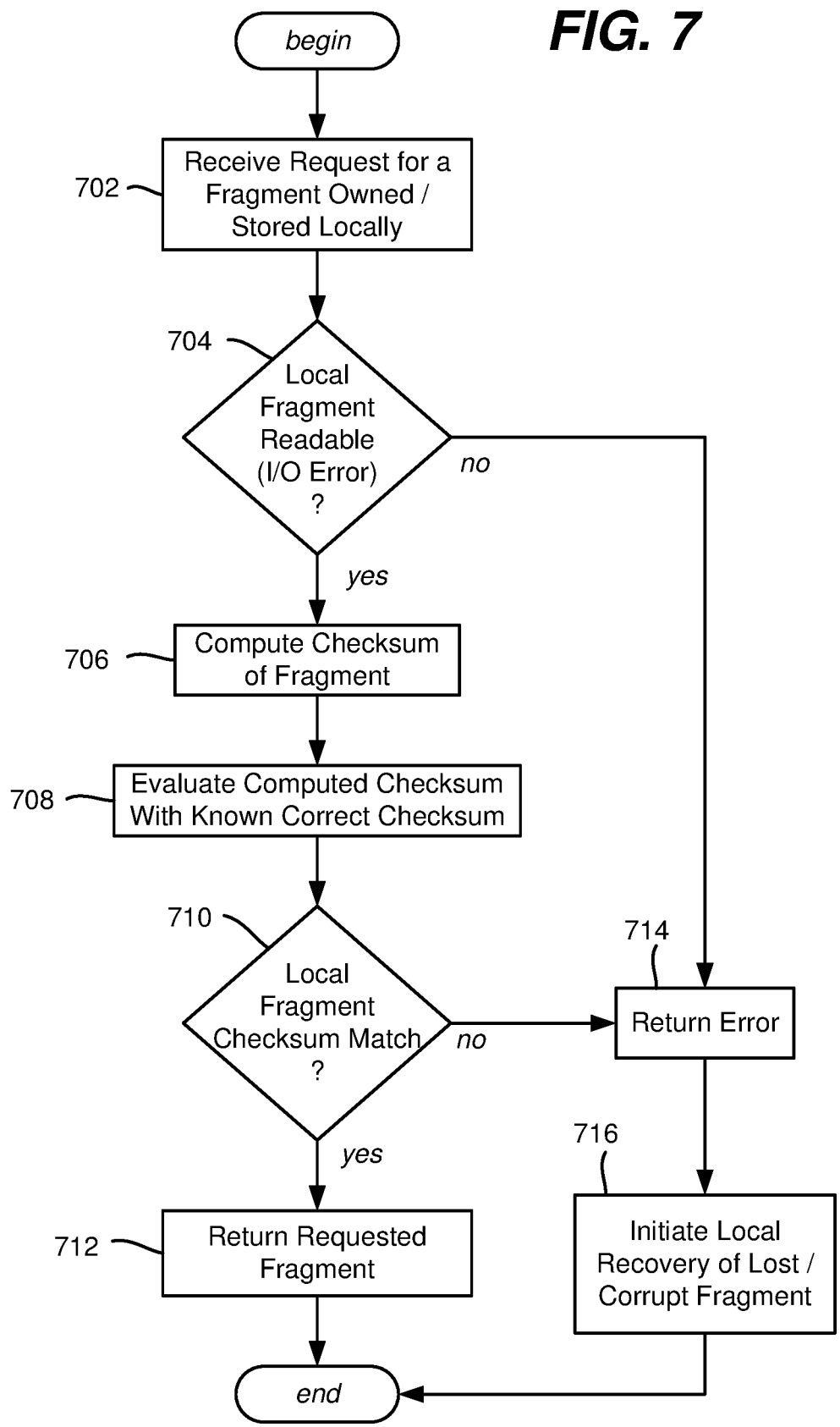
FIG. 7 is an example flow diagram showing example operations of a site handling a request to return an owned data fragment, in accordance with various aspects and implementations of the subject disclosure.

FIG. 7 shows how a site handles a request for one of its XOR-related fragments from another site, e.g., the site S1 receives a request for the XOR-related fragment a6 in the above examples of FIGS. 2 and 3 from the site S5. Note that this can be for a request from the local site itself, that is, site S1 can request the XOR-related fragment a1 from its local storage if assigned the subtask of returning recovery fragment g1. Operations 704 and 706 represent determining if an error occurred.

More particularly, when a site/cluster tries to read a local fragment, which is missing or corrupt at the low level where the filesystem can detect corruption or the fragment is not present, the cluster gets an I/O error which is detected by operation 704. If the cluster can read the fragment, the cluster makes sure the fragment is valid by computing checking the fragment's checksum (operation 706) and evaluating the computed checksum with a known correct checksum value. If the checksums do not match at operation 710, then the cluster knows that the fragment is corrupt, referred to as a high-level corruption (undetectable by the filesystem).

In a more typical case, there are no errors, and thus operation 710 branches to operation 712 to return the requested XOR-related fragment. At this time, other requests for fragments can be received and handled in a similar manner, and the site can also be processing a subtask assigned to it, as represented via the example operations of FIG. 8.

In a less typical case, when a local cluster/zone fails to read the fragment upon a request from a remote zone, (e.g., such as the fragment a4 in chunk 221 of site S1 (FIG. 2)), at operation 714 the local zone returns an error (e.g., replies "failed to read the fragment") to the remote zone requesting that XOR-related fragment, which as described with reference to FIG. 8, returns an error response to the subtask request, by which (via operation 608 of FIG. 6) the GEO recovery sub-task is appended to the end of the subtask list to be handled later. Operation 716 then triggers local recovery for the missing/corrupt fragment needed required for GEO recovery.

Figure 8:
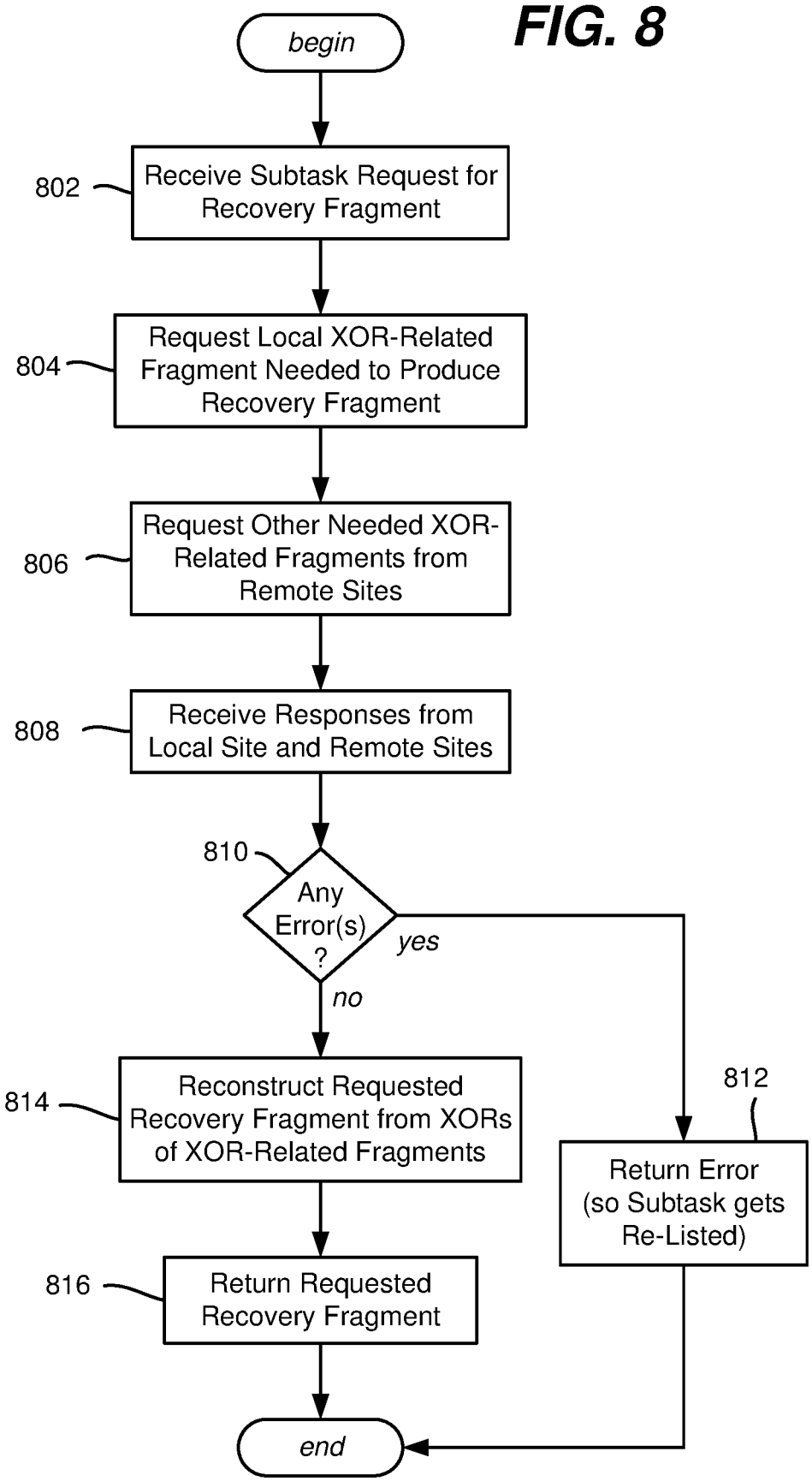
FIG. 8 is an example flow diagram showing example operations of a site with respect to handling a subtask to return a chunk recovery fragment by obtaining and XOR-ing XOR-related fragments, in accordance with various aspects and implementations of the subject disclosure.

FIG. 8 represents example operations of a site when a subtask is assigned to that site, beginning at operation 702 where a request for a recovery fragment is received. Operation 804 requests the local XOR-related fragment from local storage, e.g., site S1 requests fragment a1 from local storage. Operation 806 requests the XOR-related fragments from remote sites, e.g., to obtain recovery fragment g1, site S1 requests XOR-related fragments b1, c1, d1, e1, f1 and x1.

The responses from the local and remote sites (or only one remote site in a three site geo-environment) are received at operation 808. If any response was an error (as described above with reference to operation 714 of FIG. 7), operation 812 returns the error in response to the subtask, so that the subtask gets reassigned and the site that had received the now-failed subtask becomes available for handling another subtask. Note that any received XOR-related subtasks, before or after an error was received, can be locally cached for possible use in the event that the failed subtask gets reassigned to this same site (which can be biased to happen more often by the site assigning the subtasks to reduce overall network traffic).

If there are no errors and the full set of the XOR-related fragments are obtained, operation 814 reconstructs the requested recovery fragment by XOR-ing the XOR-related fragments of the set. Note that the site need not wait for all XOR-related fragments before starting the XOR-ing of those available, with the partial results further XOR-ed as more of the XOR-related fragments are received, and so on. Operation 816 returns the requested recovery fragment to the site that assigned the subtask, and the process ends. As described above, once the recovery fragment is returned, the site becomes available (on the site list) to handle another subtask.

Figure 9:
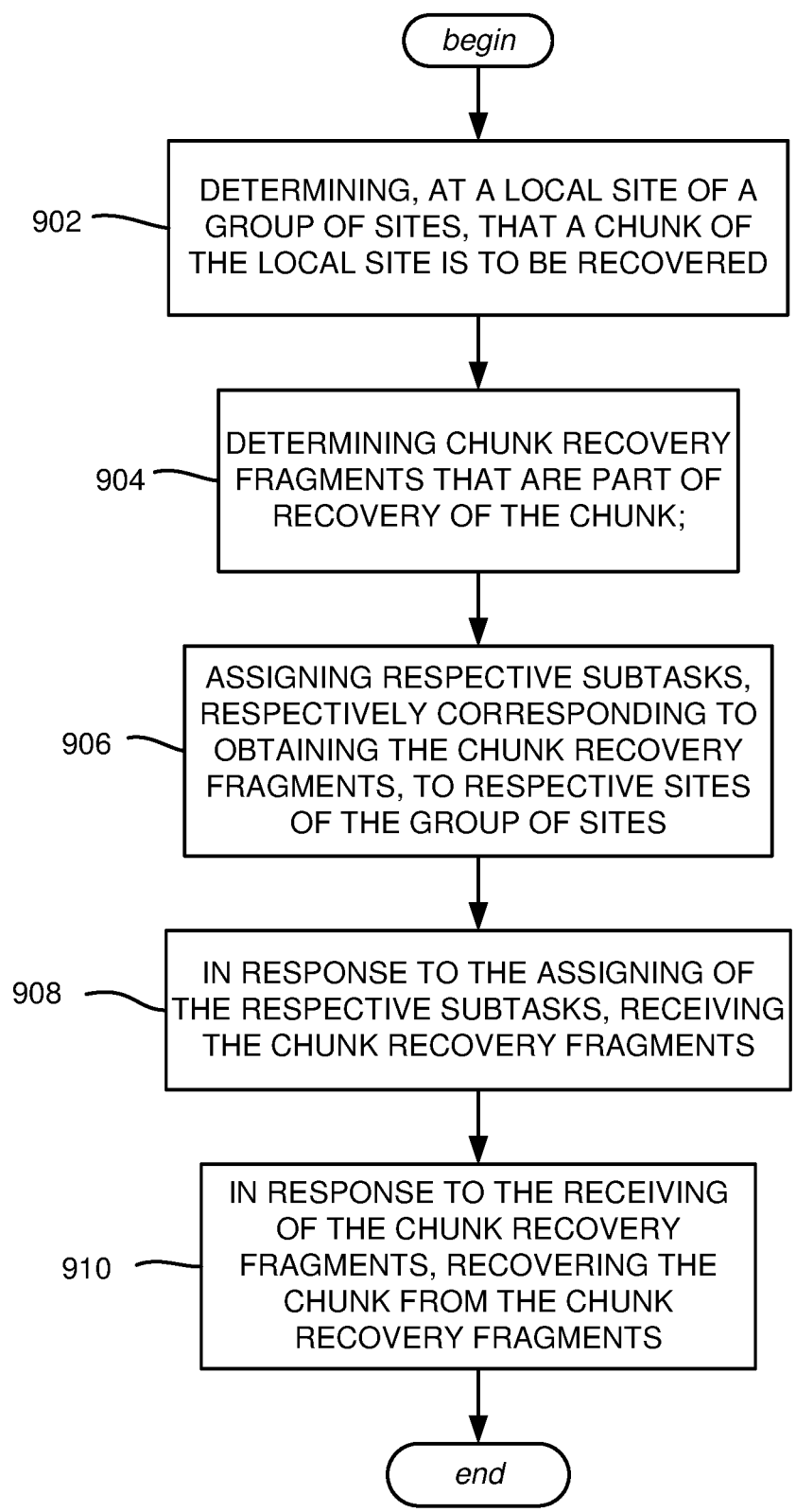
FIG. 9 is an example flow diagram showing example operations related to performing data recovery via distributing assigned subtasks to geographically distributed sites to obtain recovery fragments, in accordance with various aspects and implementations of the subject disclosure.

One or more aspects can be embodied in a system, such as represented in FIG. 9, and for example can comprise a memory that stores computer executable components and/or operations, and a processor that executes computer executable components and/or operations stored in the memory. Example operations can comprise operation 902, which represents determining, at a local site of a group of sites, that a chunk of the local site is to be recovered. Operation 904 represents determining chunk recovery fragments that are part of recovery of the chunk. Operation 906 represents assigning respective subtasks, respectively corresponding to obtaining the chunk recovery fragments, to respective sites of the group of sites. Operation 908 represents in response to the assigning of the respective subtasks, receiving the chunk recovery fragments. Operation 910 represents in response to the receiving of the chunk recovery fragments, recovering the chunk from the chunk recovery fragments.

Assigning the respective subtasks can comprise assigning a subtask to the local site.

Further operations further can comprise receiving an error in response to assigning a subtask of the respective subtasks, and reassigning the subtask of the respective subtasks.

Assigning the respective subtasks can comprise assigning the respective subtasks corresponding to obtaining a subgroup of the chunk recovery fragments, and the subgroup can comprise the chunk recovery fragments that are part of the recovery of the chunk minus at least one recovery fragment determined to be already present on the local site. The subgroup can be determined from a minimum number of chunk recovery fragments determined to be needed to perform the recovery of the chunk based on an erasure coding scheme minus the at least one recovery fragment determined to be already present on the local site.

A subtask of the respective subtasks can correspond to obtaining exclusive OR (XOR)-related recovery fragments, and XOR-ing the XOR-related recovery fragments into a chunk recovery fragment.

The chunk recovery fragments can be data fragments corresponding to an erasure coding scheme, and recovering the chunk from the chunk recovery fragments can comprise encoding the data fragments into coding fragments according to the erasure coding scheme, and storing the data fragments and the coding fragments.

The chunk recovery fragments can comprise data fragments and a coding fragment corresponding to an erasure coding scheme, and recovering the chunk from the chunk recovery fragments can comprise decoding a data fragment via the coding fragments, encoding the data fragments according to the erasure coding scheme into coding fragments, and storing the data fragments and the coding fragments.

Figure 10:
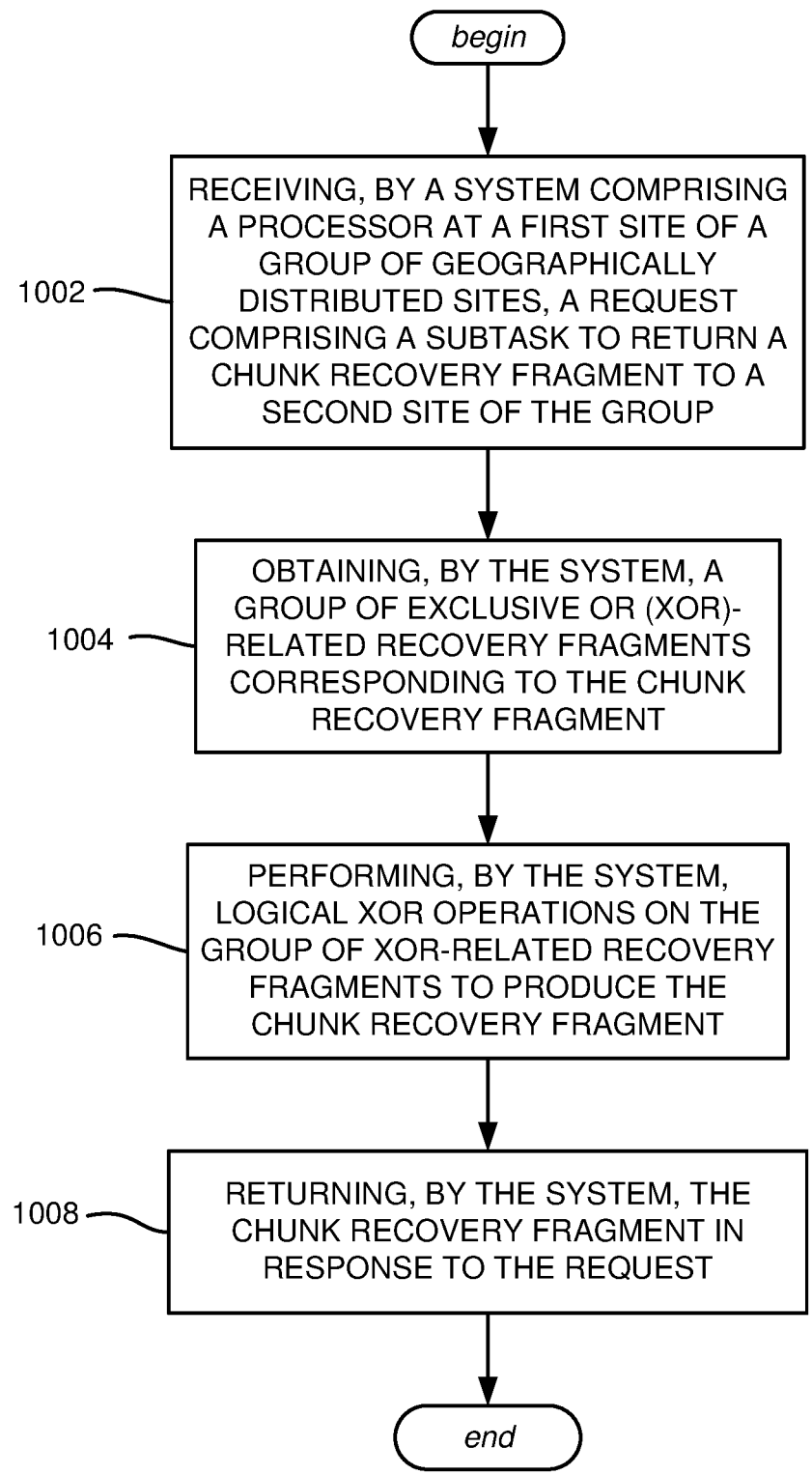
FIG. 10 is an example flow diagram showing example operations related to handling a received subtask request related to returning a recovery fragment, in accordance with various aspects and implementations of the subject disclosure.

One or more example aspects, such as corresponding to operations of a method, are represented in FIG. 10. Operation 1002 represents receiving, by a system comprising a processor at a first site of a group of geographically distributed sites, a request comprising a subtask to return a chunk recovery fragment to a second site of the group. Operation 1004 represents obtaining, by the system, a group of exclusive OR (XOR)-related recovery fragments corresponding to the chunk recovery fragment. Operation 1006 represents performing, by the system, logical XOR operations on the group of XOR-related recovery fragments to produce the chunk recovery fragment. Operation 1008 represents returning, by the system, the chunk recovery fragment in response to the request.

Obtaining the group of XOR-related recovery fragments can comprise obtaining an XOR-related recovery fragment of the group of XOR-related recovery fragments from the second site.

Obtaining the group of XOR-related recovery fragments can comprise obtaining an XOR-related recovery fragment of the group of XOR-related recovery fragments from a third site of the group.

The first site can comprise local node storage, and obtaining the group of XOR-related recovery fragments can comprise obtaining an XOR-related recovery fragment from the local node storage.

Obtaining the XOR-related recovery fragment from the local node storage can comprise performing a local recovery operation.

The request can be a first request comprising a first subtask to return a first chunk recovery fragment, the group of XOR-related recovery fragments can comprise a first group of XOR-related recovery fragments, and aspects can comprise receiving, by the system at the first site, a second request comprising a second subtask to return a second chunk recovery fragment to the second site of the group, obtaining, by the system, a second group of XOR-related recovery fragments corresponding to the second chunk recovery fragment, performing, by the system, logical XOR operations on the second group of XOR-related recovery fragments to produce the second chunk recovery fragment, and returning, by the system, the second chunk recovery fragment in response to the second request.

Figure 11:
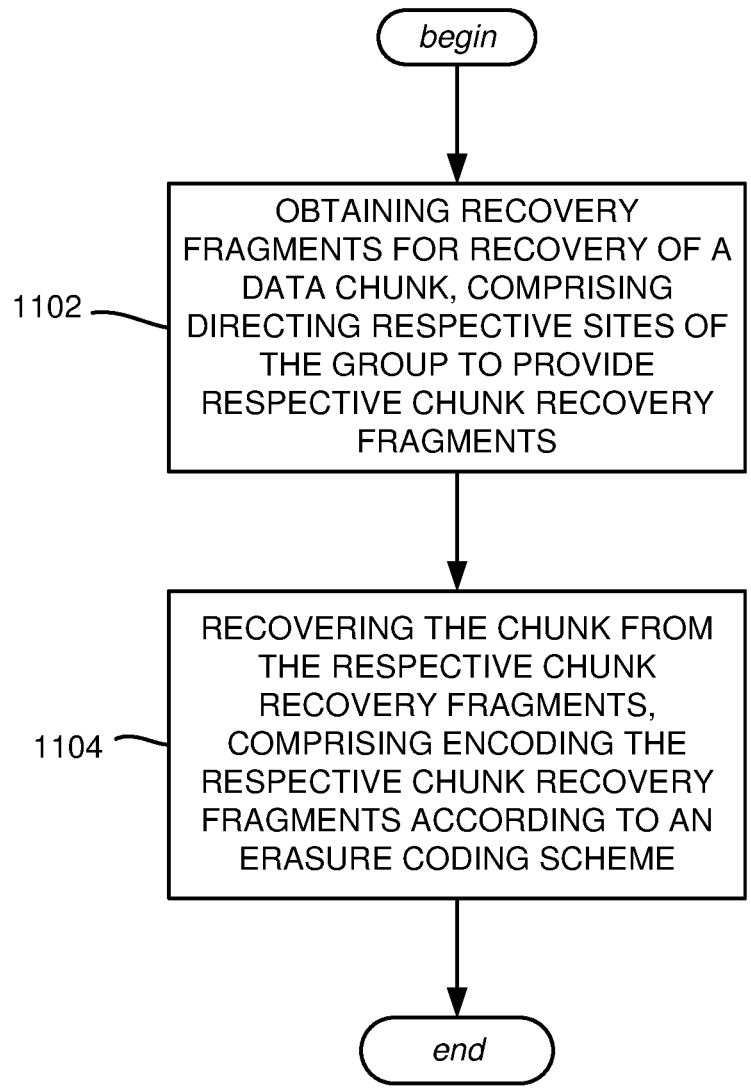
FIG. 11 is an example flow diagram showing example operations related to obtaining recovery fragments by directing distributed sites to provide the recovery fragments, and then recovering a chunk via the recovery fragments, in accordance with various aspects and implementations of the subject disclosure.

FIG. 11 summarizes various example operations, e.g., corresponding to a machine-readable storage medium, comprising executable instructions that, when executed by a local site of a group of geographically distributed sites, facilitate performance of operations. Operation 1102 represents obtaining recovery fragments for recovery of a data chunk, comprising directing respective sites of the group to provide respective chunk recovery fragments. Operation 1104 represents recovering the chunk from the respective chunk recovery fragments, comprising encoding the respective chunk recovery fragments according to an erasure coding scheme.

The chunk recovery fragments can comprise data fragments corresponding to an erasure coding process, and recovering the chunk from the chunk recovery fragments can comprise encoding the data fragments into coding fragments according to the erasure coding process, and storing the data fragments and the coding fragments.

Further operations can comprise determining a subgroup of needed chunk recovery fragments for the recovering of the chunk, the subgroup being determined based on a minimum number of chunk recovery fragments determined to be needed for recovery and any chunk recovery fragments present at the local site, and obtaining the recovery fragments can comprise assigning respective subtasks, corresponding to obtaining the recovery fragments, to a subgroup of the respective chunk recovery fragments corresponding to the subgroup of the needed chunk recovery fragments.

Directing the respective sites of the group to return the respective chunk recovery fragments can comprise directing the local site to provide a first chunk recovery fragment, and directing a remote site to provide a second chunk recovery fragment. Directing the respective sites of the group to return the respective chunk recovery fragments can comprise directing the remote site to provide a third chunk recovery fragment.

Directing the respective sites of the group to return the respective chunk recovery fragments can comprise directing the local site to provide a first chunk recovery fragment, and further operations can comprise, obtaining, at the local site, exclusive OR (XOR)-related fragments that are related to the first chunk recovery fragment by XOR operations, comprising obtaining at least one of the XOR-related fragments from a remote site, and performing XOR operations on the XOR-related fragments to produce the first chunk recovery fragment.

As can be seen, the fragment-based geo-recovery technology described herein does not break load balance at the geographically disturbed site level because up to all sites can be actively involved in the process. Indeed, the geo-recovery technology can improve the load balance, such as if a remote site that is overwhelmed at the moment chunk recovery is needed; such a site will likely work slowly and likely recover only one recovery fragment, while the remaining data fragments are recovered by faster sites. Further, corruption or loss of a data fragment does not completely block GEO recovery, as a site recovers the missing fragment while the system continues GEO recovery for other fragment indices. Further, a low bandwidth or otherwise less available remote site with the XOR chunk does not hinder GEO recovery as it would for chunk-based recovery. Such a less-available site mostly provides its XOR-related fragments to other sites, and performs less processing relative to chunk XOR-ing, which is significantly faster than transferring multiple chunks to and the less available site and having that site perform the entire XOR-ing of the (possibly many) XOR-related chunks to return the recovered chunk. In general, the technology described herein does not cause any extra inter-site network traffic.

Figure 12:
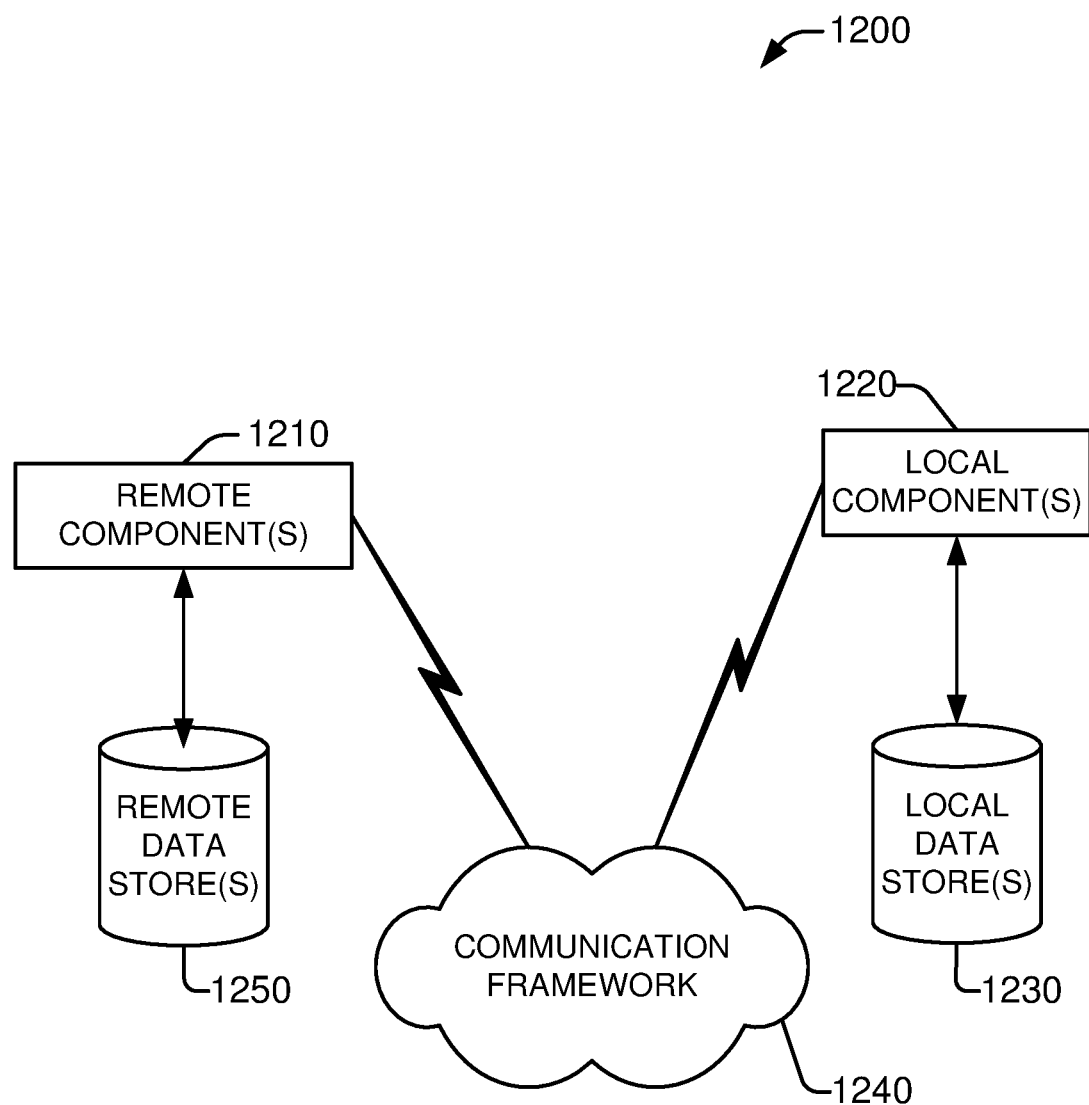
FIG. 12 is a block diagram representing an example computing environment into which aspects of the subject matter described herein may be incorporated.

FIG. 12 is a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Figure 13:
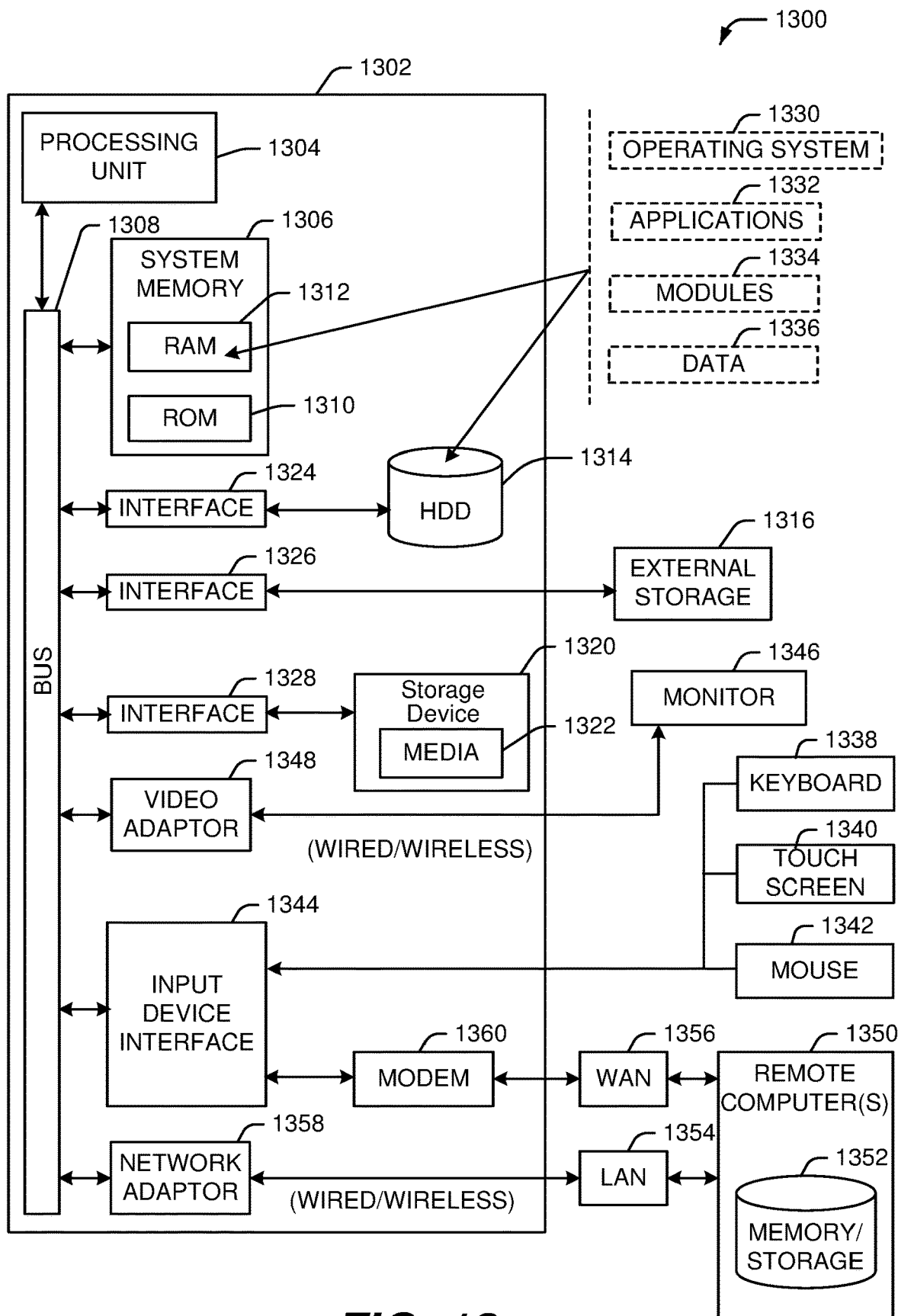
FIG. 13 depicts an example schematic block diagram of a computing environment with which the disclosed subject matter can interact/be implemented at least in part, in accordance with various aspects and implementations of the subject disclosure.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a processor, and
a memory that stores executable instructions that, when executed by the processor, facilitate performance of operations, the operations comprising:
determining, at a local site of a group of sites, that a chunk of the local site is to be recovered;

determining chunk recovery fragments that are part of recovery of the chunk;

assigning respective subtasks, respectively corresponding to obtaining the chunk recovery fragments, to respective sites of the group of sites;

in response to receiving an error corresponding to assignment of a subtask of the respective subtasks, reassigning the subtask of the respective subtasks;

in response to the assigning of the respective subtasks, receiving the chunk recovery fragments; and in response to the receiving of the chunk recovery fragments, recovering the chunk from the chunk recovery fragments.

2. The system of claim 1, wherein the assigning of the respective subtasks comprises assigning a subtask to the local site.

3. The system of claim 1, wherein the assigning of the respective subtasks comprises assigning the respective subtasks corresponding to obtaining a subgroup of the chunk recovery fragments, and wherein the subgroup comprises the chunk recovery fragments that are part of the recovery of the chunk minus at least one recovery fragment determined to be already present on the local site.

4. The system of claim 3, wherein the subgroup is determined from a minimum number of chunk recovery fragments determined to be needed to perform the recovery of the chunk based on an erasure coding scheme minus the at least one recovery fragment determined to be already present on the local site.

5. The system of claim 1, wherein a subtask of the respective subtasks corresponds to obtaining exclusive OR (XOR)-related recovery fragments, and XOR-ing the XOR-related recovery fragments into a chunk recovery fragment.

6. The system of claim 1, wherein the chunk recovery fragments are data fragments corresponding to an erasure coding scheme, and wherein the recovering the chunk from the chunk recovery fragments comprises encoding the data fragments into coding fragments according to the erasure coding scheme, and storing the data fragments and the coding fragments.

7. The system of claim 1, wherein the chunk recovery fragments comprise data fragments and a coding fragment corresponding to an erasure coding scheme, and wherein the recovering the chunk from the chunk recovery fragments comprises decoding a data fragment via the coding fragments, encoding the data fragments according to the erasure coding scheme into coding fragments, and storing the data fragments and the coding fragments.

8. A method comprising:

receiving, by a system comprising a processor at a first site of a group of geographically distributed sites, a request comprising a subtask to return a chunk recovery fragment to a second site of the group;

in response to detecting an error corresponding to an assignment of the subtask comprised in the request, reassigning, by the system, the subtask;

obtaining, by the system, a group of exclusive OR (XOR)-related recovery fragments corresponding to the chunk recovery fragment;

performing, by the system, logical XOR operations on the group of XOR-related recovery fragments to produce the chunk recovery fragment; and returning, by the system, the chunk recovery fragment in response to the request.

9. The method of claim 8, wherein the obtaining the group of XOR-related recovery fragments comprises obtaining an XOR-related recovery fragment of the group of XOR-related recovery fragments from the second site.

10. The method of claim 8, wherein the obtaining the group of XOR-related recovery fragments comprises obtaining an XOR-related recovery fragment of the group of XOR-related recovery fragments from a third site of the group.

11. The method of claim 8, wherein the first site comprises local node storage, and wherein the obtaining the group of XOR-related recovery fragments comprises obtaining an XOR-related recovery fragment from the local node storage.

12. The method of claim 11, wherein the obtaining the XOR-related recovery fragment from the local node storage comprises performing a local recovery operation.

13. The method of claim 8, wherein the request is a first request comprising a first subtask to return a first chunk recovery fragment, wherein the group of XOR-related recovery fragments comprises a first group of XOR-related recovery fragments, and further comprising receiving, by the system at the first site, a second request comprising a second subtask to return a second chunk recovery fragment to the second site of the group, obtaining, by the system, a second group of XOR-related recovery fragments corresponding to the second chunk recovery fragment, performing, by the system, logical XOR operations on the second group of XOR-related recovery fragments to produce the second chunk recovery fragment, and returning, by the system, the second chunk recovery fragment in response to the second request.

14. The method of claim 8, wherein the assigning of the subtasks comprises assigning, by the system, the subtask to a local site.

15. A non-transitory machine-readable storage medium, comprising executable instructions that, when executed by a processor of a local site of a group of geographically distributed sites, facilitate performance of operations, the operations comprising:

obtaining recovery fragments for recovery of a data chunk, comprising directing respective sites of the group to provide respective chunk recovery fragments, wherein the obtaining the recovery fragments comprises assigning respective subtasks, corresponding to obtaining the recovery fragments, to a subgroup of the respective chunk recovery fragments, and wherein, in response to receiving an error corresponding to assignment of a subtask of the respective subtasks, the subtask of the respective subtasks is reassigned; and recovering the chunk from the respective chunk recovery fragments, comprising encoding the respective chunk recovery fragments according to an erasure coding scheme.

16. The non-transitory machine-readable storage medium of claim 15, wherein the chunk recovery fragments comprise data fragments corresponding to an erasure coding process, and wherein the recovering the chunk from the chunk recovery fragments comprises encoding the data fragments into coding fragments according to the erasure coding process, and storing the data fragments and the coding fragments.

17. The non-transitory machine-readable storage medium of claim 15, wherein the operations further comprise determining a subgroup of needed chunk recovery fragments for the recovering of the chunk, the subgroup being determined based on a minimum number of chunk recovery fragments determined to be needed for recovery and any chunk recovery fragments present at the local site, and wherein the subgroup of the respective chunk recovery fragments corresponds to the subgroup of the needed chunk recovery fragments.

18. The non-transitory machine-readable storage medium of claim 15, wherein the directing the respective sites of the group to return the respective chunk recovery fragments comprises directing the local site to provide a first chunk recovery fragment, and directing a remote site to provide a second chunk recovery fragment.

19. The non-transitory machine-readable storage medium of claim 18, wherein the directing the respective sites of the group to return the respective chunk recovery fragments comprises directing the remote site to provide a third chunk recovery fragment.

20. The non-transitory machine-readable storage medium of claim 15, wherein the directing the respective sites of the group to return the respective chunk recovery fragments comprises directing the local site to provide a first chunk recovery fragment, and wherein the operations further comprise, obtaining, at the local site, exclusive OR (XOR)-related fragments that are related to the first chunk recovery fragment by XOR operations, comprising obtaining at least one of the XOR-related fragments from a remote site, and performing XOR operations on the XOR-related fragments to produce the first chunk recovery fragment.

* * * * *